3,698,887
UREAS AND PHYTOTOXICANTS
John Paul Chupp, Kirkwood, Mo., assignor to Monsanto Company, St. Louis, Mo.
No Drawing. Continuation-in-part of application Ser. No. 737,265, Mar. 26, 1968, which is a division of application Ser. No. 523,884, Feb. 1, 1966, now Patent No. 3,399,231. This application Sept. 25, 1970, Ser. No. 75,755
Int. Cl. A01n 9/20
U.S. Cl. 71—120
18 Claims

ABSTRACT OF THE DISCLOSURE

N-(1-alken-1-yl) ureas of the formula

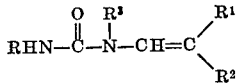

wherein $R^1$, $R^2$ and $R^3$ are alkyl and R is aryl or substituted aryl, and phytotoxic use thereof.

---

This application is a continuation-in-part of application Ser. No. 737,265 filed Mar. 26, 1968, now abandoned, which is itself a division of Ser. No. 523,884 filed Feb. 1, 1966, now issued as 3,390,231.

This invention relates to N-(1-alken-1-yl) ureas which are useful as biocides, particularly phytotoxicants, and to processes for making them. This invention further relates to phytotoxic compositions and to methods of controlling or modifying the growth of plants. The N-(1-alken-1-yl) ureas are superior phytotoxicants to their N-(2-alken-1-yl) isomers, as will be shown hereinbelow.

The term "phytotoxicant" or herbicide" as used herein and in the appended claims means materials which (1) effectively control all plants in a given locus or (2) selectively control the growth of one or more plant species in the presence of other plants. In like manner, "phytotoxic" or "herbicidal" is used to identify the overall and selective control activity of the compositions of this invention.

The term "plant" as used herein and in the appended claims is inclusive of dormant seeds, germinant seeds, germinative seeds, emerging seedlings and established woody and herbaceous vegetation including the roots and above-ground portions.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The novel N-(1-alken-1-yl) ureas of this invention are represented by the formula

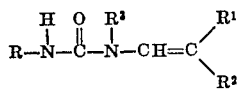

wherein R is aryl, haloaryl or haloalkaryl and $R^1$, $R^2$ and $R^3$, which can be the same or different, are alkyl having from 1 to 4 carbon atoms. The aryl, haloaryl and haloalkaryl of R in the above formula have from 6 to 18 carbon atoms and include haloaryl containing from 1 to 3 halogen atoms, and haloalkaryl containing from 1 to 3 alkyl groups each with a maximum of 4 carbon atoms and 1 to 3 halogen atoms. The aryl and substituted aryl of R in the above formula are represented by

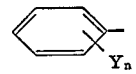

wherein Y is selected from the group consisting of halogen (Cl, Br, I and F) and haloalkyl having from 1 to 4 carbon atoms and 1 to 3 halogen atoms and n is an integer from 0 to 3.

Preferred compounds according to the above formula are wherein R is a halophenyl, especially containing more than one halo substituent or wherein R is a haloalkaryl, Still more preferred compounds of the foregoing groups are those wherein one of the halo or haloalkyl substituents is in the 4 or para position of the phenyl ring.

In the above formula, the aryl and substituted aryl of R can be, for example, phenyl, naphthyl, 2-chloronaphthyl, 2-bromonaphthyl, 4,4'-dichlorobiphenyl, biphenyl, o-chlorophenyl, m-chlorophenyl, p-chlorophenyl, p-bromophenyl, 2,4-dibromophenyl, 3,5-difluorophenyl, 2,4-dichlorophenyl, 3,5-dichlorophenyl, 2,6-dichlorophenyl, 2,6-diiodophenyl, 2,4,6-trifluorophenyl, p-fluoromethylphenyl 3,4,6-trichlorophenyl, p-chloromethylphenyl, 2,4,6-trichloromethylphenyl, 2,4,6-trifluoromethylphenyl, m-trifluoromethylphenyl, m-tribromomethylphenyl, p-trichloromethylphenyl, 3,4-dichloropropylphenyl, p-chlorobutylphenyl, 2,4-dichloroethylphenyl, p-trifluoromethylphenyl, and the like. In the above formula, $R^1$, $R^2$ and $R^3$ can be methyl, ethyl, propyl, isopropyl, n-butyl, isobutyl, and sec-butyl.

The N-(1-alken-1-yl) ureas of this invention are prepared by a process which comprises reacting an isocyanate with an N-alkylidene N-alkyl amine in accordance with the following representative synthesis

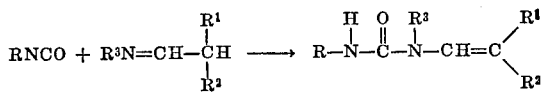

wherein R, $R^1$, $R^2$ and $R^3$ are as defined above.

The process of this invention can be carried out in a variety of ways. The process is usually carried out with substantially equimolar amounts of reactants but a small excess of either reactant can be employed if desired. The process can be carried out by simply admixing the reactants and heating at a suitable temperature, for example, from about 75° C. to about 150° C. However, reaction temperature is not critical and higher (e.g. 200° C.) or lower (e.g. 40° C.) temperatures can be employed.

The reaction is advantageously carried out in the presence of an inert organic medium. Inert organic media which can be used in the process of this invention include, for example, hydrocarbons such as benzene, toluene, xylene, cyclohexane, methylcyclohexane, n-heptane, n-hexane and the like and organic halides such as carbon tetrachloride, n-butylchloride, ethylenedichloride, tetrachloroethylene, chlorobenzene and the like.

The separation of the resulting reaction product from the reaction mixture is readily accomplished. The solvent can be removed by stripping or distillation, preferably low temperature vacuum distillation. The product if desired can be purified by any of the conventional means well-known in the art, e.g. fractional distillation under reduced pressure, selective extraction, fractional distillation using a carrier gas, film distillation, recrystallization, elution or any suitable combination of these methods.

The N-(1-alken-1-yl) ureas of this invention are liquid or crystalline solid materials which are insoluble in water but somewhat soluble in many organic solvents, for example alcohols, ketones, hydrocarbons such as benzene, toluene, xylene and the like and chlorohydrocarbons such as chlorobenzene, carbontetrachloride and the like.

In accordance with this invention it has been found that the growth of germinant seeds, emerging seedlings and established vegetation can be controlled and modified by exposing the seeds, emerging seedlings, or the roots or aboveground portions of established vegetation to the action of an effective amount of one or more of the N-(1-alken-1-yl) ureas represented by the formula

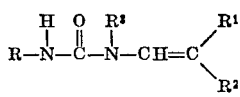

wherein R, R¹, R² and R³ are as defined above. These compounds are effective as general phytotoxicants including post-emergent phytotoxicants and pre-emergent phytotoxicants, but their most outstanding utility is as pre-emergent phytotoxicants. Furthermore, these compounds are characterized by a broad spectrum of herbicidal or phytotoxicant activity, i.e. they modify the growth of a wide variety of plant systems including both broadleaf and grass plants. For the sake of brevity and simplicity, the term "active ingredient" will be used hereinafter to describe the novel phytotoxicants of the above formula.

The phytotoxic or herbicidal compositions of this invention contain at least one active ingredient and a material referred to in the art as a phytotoxic adjuvant in liquid or solid form. The phytotoxic compositions are prepared by admixing the active ingredient with an adjuvant including diluents, extenders, carriers, and conditioning agents to provide compositions in the form of finely-divided particulate solids, granules, pellets, solutions, and aqueous dispersions or emulsions. Thus the active ingredient can be used with an adjuvant such as a finely-divided particulate solid, a solvent liquid of organic origin, water, a wetting agent, dispersing agent, an emulsifying agent, or any suitable combination of these.

Typical finely-divided solid carriers and extenders which can be used in the phytotoxic compositions of this invention include for example the talcs, clays, pumice, silica, diatomaceous earth, quartz, fuller's earth, salt, sulfur, powdered cork, powdered wood, walnut flour, chalk, tobacco dust, volcanic ash, and the like. Typical liquid diluents include for example kerosene, Stoddard solvent, hexane, benzene, toluene, acetone, ethylene dichloride, xylene, alcohols, diesel oil, glycols, and the like.

The phytotoxic compositions of this invention, particularly liquids and wettable particles, usually contain as a conditioning agent one or more surface-active agents in amounts sufficient to render a given composition readily dispersible in water or in oil. By the term "surface-active agent" it is understood that wetting-agents, dispersing agents, suspending agents and emulsifying agents are included therein.

The term "phytotoxic composition" as used herein and in the appended claims is intended to mean not only compositions in a suitable form for application but also concentrated compositions which require dilution or extension with a suitable quantity of liquid or solid adjuvant prior to application The following examples will illustrate the invention. In these examples, as well as in the specification and appended claims, parts and percent are by weight unless otherwise indicated.

EXAMPLE 1

This example describes the preparation of

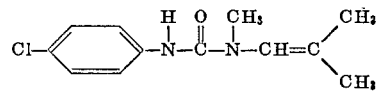

1-(p-chlorophenyl)-3-(methyl)-3-(2–methyl-1-propen-1-yl) urea

Into a suitable reaction vessel equipped with stirrer, thermometer, and reflux condenser, are charged about 23.0 parts of p-chlorophenyl isocyanate in chlorobenzene and 12.8 parts of N-isobutylidene N-methyl amine. The reaction mixture is heated at reflux for seven hours. At the end of this time the chlorobenzene is removed by evaporation at reduced pressure and 34.7 parts of yellow oil are recovered. A portion of this oil is dissolved in hexane. The hexane is cooled and the yellow oil crystallizes. These crystals are then used to seed the remaining portion of yellow oil. Upon seeding the oil crystallizes. The solid product is then recrystallized from cyclohexane. The assigned structure of the product, M.P. 78–82° C., is confirmed by nuclear magnetic resonance (NMR) spectrum analysis.

Calc'd for $C_{12}H_{15}N_2OCl$ (percent): C, 60.37; H, 6.33; N, 11.74; Cl, 14.85. Found (percent): C, 60.56; H, 6.14; N, 14.58; Cl, 14.58.

EXAMPLE 2

This example describes the preparation of

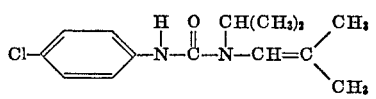

1-(p-chlorophenyl)-3-(isopropyl)-3-(2-methyl-1-propen-1-yl) urea

Into a reaction vessel equipped with stirrer, thermometer, and reflux condenser, are charged about 15.4 parts of p-chlorophenyl isocyanate, 100 parts of chlorobenzene and 11.3 parts of N-isobutylidene N-isopropyl amine. The reaction mixture is heated at reflux for one hour. At the end of this time the chlorobenzene is removed by evaporation at reduced pressure. The residue is eluted through $SiO_2$ with carbon tetrachloride to recover the product which after being crystallized from pentane has a melting point of 53–55° C.

Calc'd for $C_{14}H_{19}N_2OCl$ (percent): C, 63.2; H, 7.15; Cl, 13.4; N, 10.5. Found (percent): C, 63.27; H, 7.30; Cl, 13.5; N, 10.54.

EXAMPLE 3

This example describes the preparation of

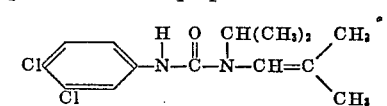

1-(3,4-dichlorophenyl)-3-(isopropyl)-3-(2-methyl-1-propen-1-yl) urea

Into a reaction vessel equipped with stirrer, thermometer, and reflux condenser, are charged about 18.8 parts of 3,4-dichlorophenyl isocyanate in tetrachloroethylene and 11.3 parts of N-isobutylidene N-isopropyl amine. The reaction mixture is heated at reflux for one hour. At the end of this time the tetrachloroethylene is removed by evaporation at reduced pressure. The residue is crystallized from hexane to recover the solid product, M.P. 80–81° C.

Calc'd for $C_{14}H_{18}N_2OCl_2$ (percent): C, 55.7; H, 5.98; Cl, 23.6; N, 9.3. Found (percent): C, 55.9; H, 5.63; Cl, 23.55; N, 9.15; M.W., 305.

EXAMPLE 4

This example describes the preparation of

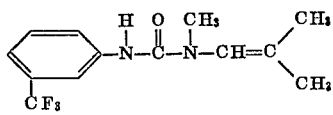

1-(m-trifluoromethylphenyl)-3-(methyl)-3-(2-methyl-1-propel-1-yl) urea

Into a reaction vessel equipped with stirrer, thermometer, and reflux condenser, are charged about 18.7 parts of trifluoromethylphenyl isocyanate in chlorobenzene and 8.5 parts of N-isobutylidene N-methyl amine. The reaction mixture is heated at reflux for about one hour. At the end of this time the chlorobenzene is removed by evaporation at reduced pressure and the product oil is recovered.

Calc'd for $C_{13}H_{15}N_2OF_3$ (percent): N, 10.3; F, 21.0. Found (percent): N, 9.5; F, 22.4.

Following the procedure of the foregoing examples and using the appropriate isocyanate and alkylidene amine reactants, the following N-(1-alken-1-yl) ureas are prepared.

Example:
5. 1-(phenyl)-3-(methyl)-3-(2-methyl-1-propen-1-yl) urea
6. 1-(phenyl)-3-(methyl)-3-(2-ethyl-1-propen-1-yl) urea
7. 1-(phenyl)-3-(ethyl)-3-(2-ethyl-1-propen-1-yl) urea
8. 1-(phenyl)-3-(ethyl)-3-(2-methyl-1-buten-1-yl) urea
9. 1-(p-chlorophenyl)-3-(ethyl)-3-(2-methyl-1-buten-1-yl) urea
10. 1-(m-chlorophenyl)-3-(ethyl)-3-(2-ethyl-1-hepten-1-yl) urea
11. 1-(2,6-dichlorophenyl)-3-(methyl)-3-(2-ethyl-1-hepten-1-yl) urea
12. 1-(2,4-dichlorophenyl)-3-(isopropyl)-3-(2-methyl-1-buten-1-yl) urea
13. 1-(4,5-dichlorophenyl)-3-(methyl)-3-(2-methyl-1-propen-1-yl) urea
14. 1-(o-chlorophenyl)-3-(methyl)-3-(2-n-butyl-1-propen-1-yl) urea
15. 1-(p-chloromethylphenyl)-3-(methyl)-3-(2-ethyl-1-propen-1-yl) urea
16. 1-(m-fluoromethylphenyl)-3-(methyl)-3-(2-ethyl-1-propen-1-yl) urea
17. 1-(p-fluoromethylphenyl)-3-(ethyl)-3-(2-methyl-1-hepten-1-yl) urea
18. 1-(3,4-difluoromethylphenyl)-3-(methyl)-3-(2-methyl-1-propen-1-yl) urea
19. 1-(m-trifluoromethylphenyl)-3-(ethyl)-3-(2-methyl-1-propen-1-yl) urea
20. 1-(m-trifluoromethylphenyl)-3-(methyl)-3-(2-methyl-1-buten-1-yl) urea
21. 1-(2,4-dichlorophenyl)-3-(methyl)-3-(2-methyl-1-propen-1-yl) urea
22. 1-(2,6-dichlorophenyl)-3-(isopropyl)-3-(2-methyl-1-propen-1-yl) urea
23. 1-(p-chloromethylphenyl)-3-(isopropyl)-3-(2-methyl-1-propen-1-yl) urea
24. 1-(m-trifluoromethylphenyl)-3-(ethyl)-3-(2-methyl-1-propen-1-yl) urea

EXAMPLES 25–33

The pre-emergent phytotoxicity of representative N-(1-alken-1-yl) ureas of this invention is demonstrated as follows. A good grade of top soil is placed in 9½" x 5¾" x 2¾" aluminum pans and compacted to a depth of ⅜" to ½" from the top of each pan. A predetermined number of seeds of each of eighteen plant species are placed on top of the soil in separate pans. The phytotoxic compositions are applied to the soil by two methods: (1) application to the surface of the top soil layer and (2) admixture with or incorporation in the top soil layer.

In the surface application method, the seeds are covered with a ⅜" layer of prepared soil and the pan leveled. The phytotoxic composition is applied by spraying the surface of the top layer of soil, prior to watering the seeds, with a solution containing a sufficient amount of active ingredient to obtain the desired rate per acre in the soil surface. In the soil incorporation method, the soil required to fill the pans is weighed and admixed with a phytotoxic composition containing a known amount of active ingredient. The pans are then filled with the admixture and leveled. Initial watering is carried out by permitting the soil in the pans to absorb moisture through the apertured bottom of the pans.

The seed containing pans are placed on a wet sand bench and maintained for 14 days under ordinary conditions of sunlight and watering. The plants are observed at the end of fourteen days and the results recorded. The phytotoxic activity index is based on the average percent germination of each seed lot. The activity index is converted to a relative numerical scale for the sake of brevity and simplicity in the examples. The pre-emergent phytotoxic acitvity index used in the following examples is defined as follows:

| Numerical scale | Average percent germination | Phytotoxic activity |
| --- | --- | --- |
| 0 | 76–100 | No phytotoxicity. |
| 1 | 51–75 | Slight phytotoxicity. |
| 2 | 26–50 | Moderate phytotoxicity. |
| 3 | 0–25 | Severe phytotoxicity. |

The pre-emergent phytotoxic activity of some of the N-(1-alken-1-yl)ureas of this invention is recorded in Table I for various application rates of the active ingredients in both surface and soil-incorporation applications. In Table I, the various plant seeds are represented by letters as follows:

A—Morning glory
B—Wild oats
C—Brome grass
D—Rye grass
E—Radish
F—Sugar beets
G—Cotton
H—Corn
I—Foxtail
J—Barnyard grass
K—Crab grass
L—Pigweed
M—Soybean
N—Wild buckwheat
O—Tomato
P—Sorghum
Q—Rice

TABLE I

[Pre-emergent phytotoxic activity of N-(1-alken-1-y-1 ureas]

| Example | Compound | Rate, lb./acre | Application method | Plant species | | | | | | | | | | | | | | | | | |
|---|---|---|---|---|---|---|---|---|---|---|---|---|---|---|---|---|---|---|---|---|---|
| | | | | A | B | C | D | E | F | G | H | I | J | K | L | M | N | O | P | Q |
| 25 | 1-(3,4-dichlorophenyl)-3-methyl-3-(2-methyl-1-propen-1-yl) urea. | 10 | SA | 1 | 3 | 3 | 3 | 3 | 3 | | | 3 | | 3 | 3 | 0 | 3 | 3 | 3 | |
| | | 5 | SI | 3 | 2 | 3 | 3 | 3 | 3 | 0 | 1 | 3 | 3 | 3 | 3 | 2 | 3 | 3 | 3 | 1 |
| | | 1 | SI | 0 | 2 | 1 | 2 | 1 | 2 | 2 | 0 | 3 | 2 | 3 | 3 | 0 | 3 | 1 | 2 | 2 |
| | | 0.25 | SI | 0 | 0 | 1 | 1 | 0 | 1 | 1 | 0 | 2 | 1 | 1 | 2 | 0 | 2 | 1 | 0 | 1 |
| 26 | 1-(m-trifluoromethylphenyl)-3-methyl-3-(2-methyl-1-propen-1-yl) urea. | 5 | SA | 0 | 0 | 0 | 1 | 0 | 3 | | | 2 | | 3 | 3 | 1 | 3 | 2 | 1 | |
| | | 1 | SI | | 1 | 0 | | | 2 | 0 | 0 | | 0 | 0 | 3 | 0 | | | | 1 |
| 27 | 1-(p-chlorophenyl)-3-methyl-3-(2-methyl-1-propen-1-yl) urea. | 5 | SA | 2 | 0 | 1 | 2 | 3 | 3 | | | 2 | | 3 | 3 | 1 | 2 | 3 | 1 | |
| | | 1 | SI | 0 | 0 | 0 | 0 | 0 | 3 | 0 | 0 | 1 | 1 | 1 | 1 | 0 | 2 | 1 | 0 | 0 |
| 28 | 3-(3,4-dichlorophenyl)-1-isopropyl-1-(2-methyl-1-propen-1-yl) urea. | 5 | SA | 0 | 0 | 2 | 1 | 0 | 3 | | | 3 | | 3 | 3 | 1 | 0 | 0 | 1 | |
| 29 | 3-(3,4-dichlorophenyl)-1-ethyl-1-(2-methyl-1-propen-1-yl) urea. | 5 | SA | 3 | 0 | 0 | 2 | 1 | 3 | | | 3 | | 3 | 3 | 1 | 3 | 2 | 2 | |
| 30 | 3-(p-chlorophenyl)-1-ethyl-1-(2-methyl-1-propen-1-yl) urea. | 5 | SA | 0 | 0 | 0 | 3 | 0 | 3 | | | 3 | | 3 | 3 | 1 | 2 | 3 | 1 | |
| 31 | 3-(4-chlorophenyl)-1-isopropyl-1-(2-methyl-1-propen-1-yl) urea. | 5 | SA | 1 | 0 | 0 | 0 | 0 | 3 | | | 0 | | 0 | 3 | 0 | 2 | 1 | 0 | |
| 32 | 3-(m-chlorophenyl)-1-methyl-1-(2-methyl-1-propen-1-yl) urea. | 5 | SA | 0 | 0 | 1 | 0 | 3 | 3 | | | 2 | | 3 | | 1 | 2 | 3 | 1 | |
| 33 | 1-isobutenyl-3-(o-fluorophenyl)-1-methylurea. | 5 | SA | 3 | 3 | 3 | 3 | 3 | 3 | | | 3 | | 3 | 3 | 3 | 2 | 3 | 3 | |

SA=Surface application method. SI=Soil incorporation method.

EXAMPLES 34–40

These examples describe the post-emergent phytotoxic activity of the N-(1-alken-1-yl) ureas of this invention. The active ingredients are applied in spray form to 14-day old or 21-day old specimens of the same plants used in the pre-emergent tests above. The phytotoxic sprays are acetone-water solutions containing 0.5%, 0.2% and 0.05% active ingredient and a small amount of a standard emulsifier. The solutions are applied to the plants in different sets of pans at rates equal to approximately 10, 4 and 1 pounds of active ingredient per acre. The treated plants are placed in a greenhouse and the effects are observed and recorded after 14 days.

The post-emergent phytotoxic activity index used in this example is based on the average percent injury of each plant species and is defined as follows:

| Numerical scale | Average percent injury | Phytotoxic activity |
|---|---|---|
| 0 | 0–25 | No phytotoxicity. |
| 1 | 26–50 | Slight phytotoxicity. |
| 2 | 51–75 | Moderate phytotoxicity. |
| 3 | 76–99 | Severe phytotoxicity. |
| 4 | 100 | Plant dead. |

The identification of the plants used is the same as in the above pre-emergent tests. Results and further details are given in Table II.

TABLE II

[Post-emergent phytotoxic activity of N-(1-alken-1-yl) ureas]

| Example | Compound | Rate, lb./acre | Plant species | | | | | | | | | | | | | | | | Age in Weeks |
|---|---|---|---|---|---|---|---|---|---|---|---|---|---|---|---|---|---|---|---|
| | | | A | B | C | D | E | F | G | H | I | J | K | L | M | N | O | P | |
| 34 | 3-(3,4-dichlorophenyl)-1-methyl-1-(2-methyl-1-propen-1-yl) urea. | 10 | 4 | 4 | 4 | 4 | 4 | 4 | | | 4 | | 4 | 4 | 4 | 4 | 4 | 4 | 3 |
| | | 4 | 4 | 4 | 3 | 3 | 4 | 4 | 3 | 4 | 4 | 4 | 4 | 4 | 4 | 4 | 4 | 3 | 3 |
| | | 1 | 4 | 2 | 2 | 2 | 3 | 4 | 2 | 1 | 3 | 3 | 4 | 4 | 4 | 4 | 4 | 2 | 3 |
| 35 | 3-(3,4-dichlorophenyl)-1-isopropyl-1-(2-methyl-1-propen-1-yl) urea. | 10 | 2 | 1 | 1 | 1 | 2 | 2 | | | 1 | | 1 | 4 | 1 | 4 | 3 | 1 | 3 |
| 36 | 3-(3,4-dichlorophenyl)-1-isopropyl-1-(2-methyl-1-propen-1-yl) urea. | 10 | 3 | 0 | 0 | 0 | 3 | 3 | | | 1 | | 2 | 4 | 1 | 1 | 2 | 0 | 2 |
| 37 | 3-(p-chlorophenyl)-ethyl-1-(2-methyl-1-propen-1-yl) urea. | 10 | 1 | 0 | 0 | 0 | 1 | 1 | | | 1 | | 0 | 1 | 2 | 1 | 3 | 0 | 3 |
| 38 | 3-(m-chlorophenyl)-1-methyl-1-(2-methyl-1-propen-1-yl) urea. | 10 | 3 | 1 | 1 | 1 | 1 | 3 | | | 1 | | 1 | 2 | 3 | 3 | 3 | 1 | 2 |
| 39 | 1-methyl-1-(2-methyl-1-propen-1-yl)-3-(α, α, α-trifluoro-m-tolyl) urea. | 10 | 3 | 0 | 0 | 0 | 3 | 3 | | | 0 | | 0 | 2 | 2 | 4 | 3 | 0 | 2 |
| 40 | 1-isobutenyl-3-(o-fluorophenyl)-1-methylurea. | 10 | 4 | 3 | 3 | 3 | 3 | 4 | | | 3 | | 3 | 4 | 3 | 4 | 4 | 3 | 2 |

It has been found that the compounds of this invention (i.e. having the double bond in the 1-position of the alkenyl group) are unpredictably and unobviously superior to their position isomers (i.e. compounds which are otherwise identical except for having the double bond in the 2-position of the alkenyl group). Data in support of that conclusion will be found below.

EXAMPLES 41–43

Following the general pre-emergent surface application procedure set forth in Examples 25–33, the comparative experiments reported below were carried out using a dosage rate of about 5 lbs./acre. The results in these experiments are set forth in Tables III, IV and V.

TABLE III

|  | Example 29 [1] | Compound A [2] | Better rating Example 29 | Better rating Compound A |
|---|---|---|---|---|
| Morning glory | 1 | 0.5 | X |  |
| Wild oat | 2.5 | 0 | X |  |
| Brome | 0 | 0.5 |  | X |
| Rye grass | 3 | 1 | X |  |
| Radish | 3 | 0 | X |  |
| Sugar beet | 3 | 3 |  |  |
| Foxtail | 3 | 2.5 | X |  |
| Crab grass | 3 | 3 |  |  |
| Pigweed | 3 | 3 |  |  |
| Soybean | 1.5 | 0.5 | X |  |
| Wild buckwheat | 3 | 2.5 | X |  |
| Tomato | 3 | 1.5 | X |  |
| Sorghum | 3 | 1 | X |  |
| Total | 32 | 19 |  |  |

[1] Example 29 is 3-(3, 4-dichlorophenyl)-1-methyl-1-(1-isobutenyl) urea.
[2] Compound A is (3, 4-dichlorophenyl)-1-methyl-1-(2-isobutenyl) urea.

The data in Table III clearly shows the compound of this invention to be superior to its respective isomer, in fact to the extent of being about 170% as active. This is determined as follows:

$$\frac{32}{19} \times 100 = 170\%$$

TABLE IV

|  | Example 30 [1] | Compound B [2] | Better rating Example 30 | Better rating Compound B |
|---|---|---|---|---|
| Morning glory | 0.5 | 0.5 |  |  |
| Wild oat | 0 | 0 |  |  |
| Brome | 1 | 3 |  | X |
| Rye grass | 1.5 | 1 | X |  |
| Radish | 1 | 1.5 |  | X |
| Sugar beet | 3 | 1.5 | X |  |
| Foxtail | 3 | 3 |  |  |
| Crab grass | 3 | 3 |  |  |
| Pigweed | 3 | 3 |  |  |
| Soybean | 0.5 | 0 | X |  |
| Wild buckwheat | 2.5 | 0 | X |  |
| Tomato | 2 | 0 | X |  |
| Sorghum | 1 | 0.5 | X |  |
| Total | 22 | 17 |  |  |

[1] Example 30 is 3-(p-chlorophenyl)-1-methyl-1-(1-isobutenyl) urea.
[2] Compound B is 3-(p-chlorophenyl)-1-methyl-1-(2-isobutenyl) urea.

The data in Table IV clearly shows the compound of this invention to be superior to its respective isomer, in fact to the extent of being about 130% as active. This is determined as follows:

$$\frac{22}{17} \times 100 = 130\%$$

TABLE V

|  | Example 31 [1] | Compound C [2] | Better rating Example 31 | Better rating Compound C |
|---|---|---|---|---|
| Morning glory | 1.5 | 0 | X |  |
| Wild oats | 1.5 | 0 | X |  |
| Brome | 1 | 0.5 | X |  |
| Rye grass | 2 | 1 | X |  |
| Radish | 2.5 | 0.5 | X |  |
| Sugar beet | 3 | 3 |  |  |
| Foxtail | 3 | 1.5 | X |  |
| Crab grass | 3 | 3 |  |  |
| Pigweed | 3 | 3 |  |  |
| Soybean | 2 | 2 |  |  |
| Wild buckwheat | 3 | 2 | X |  |
| Tomato | 2.5 | 0 | X |  |
| Sorghum | 3 | 1 | X |  |
| Total | 31 | 17.5 |  |  |

[1] Example 31 is 3-(o-fluorophenyl)-methyl-1-(1-isobutenyl)urea.
[2] Compound C is 3-(o-fluorophenyl)-1-methyl-1-(2-isobutenyl)urea.

The data in Table V clearly shows the compound of this invention to be superior to its respective isomer, in fact to the extent of being about 177% as active. This is determined as follows:

$$\frac{31}{17.5} \times 100 = 177\%$$

EXAMPLES 44–45

Following the general post-emergent application procedure set forth in Examples 34–40, the comparative experiments reported below were carried out using a concentration of 0.2% (i.e. about 4 lb./acre dosage rate). The results in these experiments are set forth in Tables VI and VII.

TABLE VI

|  | Example 32 [1] | Compound A [2] | Better rating Example 32 | Better rating Compound A |
|---|---|---|---|---|
| Soybean | 4 | 3 | X |  |
| Sugar beet | 4 | 4 |  |  |
| Wheat | 2 | 1 | X |  |
| Rice | 4 | 1.5 | X |  |
| Sorghum | 3.5 | 0 | X |  |
| Cocklebur | 4 | 2.5 | X |  |
| Wild buckwheat | 4 | 4 |  |  |
| Morning glory | 4 | 1 | X |  |
| Hemp sesbania | 4 | 3.5 | X |  |
| Lambsquarter | 4 | 3 | X |  |
| Velvet leaf | 4 | 1 | X |  |
| Downy brome | 3 | 1.5 | X |  |
| Panicum Spp | 4 | 3 | X |  |
| Barnyard grass | 4 | 1.5 | X |  |
| Crab grass | 4 | 3 | X |  |
| Total | 56.5 | 33.5 |  |  |

[1] Example 32 is 3-(3,4-dichlorophenyl)-1-methyl-1-(1-isobutenyl)urea.
[2] Compound A is 3-(3,4-dichlorophenyl)-1-methyl-1-(2-isobutenyl)urea.

The data in Table VI clearly shows the compound of this invention to be superior to its respective isomer, in fact to the extent of being about 169% as active. This is determined as follows:

$$\frac{56.5}{33.5} \times 100 = 169\%$$

TABLE VII

|  | Exam- ple 33 [1] | Com- pound B [2] | Better rating Exam- ple 33 | Com- pound B |
|---|---|---|---|---|
| Soybean | 2 | 1 | X | |
| Sugar beet | 3 | 0.5 | X | |
| Wheat | 0 | 0 | | |
| Rice | 1.5 | 0 | X | |
| Sorghum | 3 | 0 | X | |
| Cocklebur | 2 | 0.5 | X | |
| Wild buckwheat | 4 | 2 | X | |
| Morning Glory | 2 | 0 | X | |
| Hemp sesbania | 1 | 1 | | |
| Lambsquarter | 4 | 4 | | |
| Velvet leaf | 2 | 0 | X | |
| Downy brome | 1 | 0 | X | |
| Panicum Spp | 1 | 0 | X | |
| Barnyard grass | 1 | 0 | X | |
| Crab grass | 2 | 1 | X | |
| Total | 29.5 | 10 | | |

[1] Example 33 is 3-(p-chlorophenyl)-1-methyl-1-(1-isobutenyl)urea.
[2] Compound B is 3-(p-chlorophenyl)-1-methyl-1-(2-isobutenyl)urea.

The data in Table VII clearly shows the compound of this invention to be superior to its respective isomer, in fact to the extent of being about 295% as active. This is determined as follows:

$$\frac{29.5}{10} \times 100 = 295\%$$

As mentioned hereinbefore the phytotoxic compositions of this invention comprise an active ingredient and one or more herbicide adjuvants. By herbicide adjuvant is meant, one which is suitable for use with herbicides. They can be solid or liquid extenders, carriers, diluents, conditioning agents and the like. Preferred phytotoxic compositions containing the active ingredients of this invention have been developed so that the active ingredients can be used to the greatest advantage to modify the growth of plants in soil. The preferred compositions comprise certain wettable powders, aqueous suspensions, dust formulations, granules, emulsifiable oils and solutions in solvents. In general these preferred compositions can all contain one or more surface-active agents.

Surface-active agents which can be used in the phytotoxic compositions of this invention are set out, for example, in Searle U.S. Pat. 2,426,417, Todd U.S. Pat. 2,655,447, Jones U.S. Pat. 2,412,510 and Lenher U.S. Pat. 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), by J. W. McCutcheon, Inc., and Bulletin E–607 of the Bureau of Entomology and Plant Quarantine of the U.S.D.A. In general less than 15 parts by weight of the surface active agent is present per 100 parts by weight of phytotoxic composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amines, long chain acid esters of sodium isethionate, esters of sodium sulfosuccinate, sulfated or sulfonated fatty acid esters, petroleum sulfonates, sulfonated vegetable oils and ditertiary acetylinic glycols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powder compositions of this invention usually contain from about 5 to about 95 parts of active ingredient, from about 0.25 to about 3.0 parts of wetting agent, from about 0.25 to about 7 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor, an anti-foaming agent or both.

Aqueous suspensions are prepared by mixing together an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed, coverage is very uniform.

Dusts are dense finely divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing finely-divided particulate extender. However, their performance is sometimes aided by the inclusion of a wetting agent such as those listed hereinbefore under wettable powder compositions and convenience in manufacture frequently demands the inclusion of an inert, adsorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be either of vegetable or mineral origin. The solid extenders are characterized by possessing relatively low surface areas and are poor in liquid absorption. Suitable inert solid extenders for phytotoxic dusts include micaceous talcs, pyrophyllite, dense kaolin clays, ground calcium phosphate rock and tobacco dust. The dusts usually contain from about 1 to 99 parts active ingredient, 0 to 50 parts grinding aid, 0 to 3 parts wetting agent and 1 to 99 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible solvents together with a surfactant. Suitable solvents for the active ingredient of this invention include hydrocarbons and water-immiscible ethers, esters or ketones. Suitable surfactants are anionic, cationic and nonionic such as alkyl aryl polyethoxy alcohols, alkyl and alkyl aryl polyether alcohols, polyethylene sorbitol or sorbitan fatty acid esters, polyethylene glycol fatty esters, fatty alkyllol amide condensates, amine salts of fatty alcohol sulfates together weight of clay. The preferred phytotoxic granular compositions contain from about 10 parts to about 25 parts by weight of active ingredient per 100 parts by weight of clay.

The phytotoxic compositions of this invention can also contain other additaments, for example fertilizers, other phytotoxicants, pesticides and the like, used as adjuvant or in combination with any of the above-described adjuvants. Phytotoxicants useful in combination with the above-described compounds include for example 2,4-dichlorophenoxyacetic acids, 2,4,5-trichlorophenoxyacetic acid, 2-methyl-4-chlorophenoxyacetic acid and the salts, esters and amides thereof, triazine derivatives, such as 2,4 - bis(3-methoxypropylamino)-6-methylthio-S-triazine;

2-chloro-4-ethylamino-6-isopropylamino-S-triazine, and 2-ethylamino - 4 - isopropylamino-6-methylmercapto-S-triazine; acetanilides such as N-isopropyl-α-chloroacetanilide, and N-ethyl-α-chloro-2-methylacetanilide and 2-tert-butyl--2'-chloro-6-methylacetanilide, and acetamides such as N,N - diallyl-α-chloroacetamide, N-(α-chloroacetyl)hexamethylene imine, and N,N-diethyl-α-bromoacetamide, and the like. Fertilizers useful in combination with the active ingredients include for example ammonium nitrate, urea and superphosphate. Other useful additiments include materials in which plant organisms take root and grow such as compost, manure, humus, sand and the like.

When operating in accordance with the present invention, effective amounts of the N-(1-alken-1-yl) ureas are dispersed in soil or plant growth media and applied to plants in any convenient fashion. Application to the soil or growth media can be carried out by simply mixing with the media, by applying to the surface of the soil and thereafter dragging or discing into the soil to the desired depth, or by employing a liquid carrier to accomplish the penetration and impregnation. The application of liquid and particulate solid phytotoxic compositions to the surface of soil or to above ground surfaces of plants can be carried out by conventional methods, e.g. power dusters, boom and hand sprayers and spray dusters. The compositions can also be applied from airplanes as a dust or a spray because of their effectiveness at low dosages.

In a further method, the distribution of the active ingredients in soil can be carried out by admixture with the water employed to irrigate the soil. In such procedures, the amount of water can be varied with the porosity and water holding capacity of the soil to obtain the desired depth of distribution of the phytotoxicants.

The application of an effective or phytotoxic amount of the N-(1-alken-1-yl) ureas to the soil or growth media or plant is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific N-(1-alken-1-yl) urea employed. In foliar treatment for the control or modification of vegetative growth, the active ingredients are applied in amounts from about 1 to about 50 or more pounds per acre. In applications to soil for the control or modification of the growth of germinant seeds, emerging seedlings and established vegetation, the active ingredients are applied in amounts from about 0.01 to about 25 or more pounds per acre. In such soil applications, it is desirable that the active ingredients be distributed to a depth of at least 0.2 inch and preferably in amounts from about 0.01 pound to about 5 pounds per acre. It is believed that one skilled in the art can readily determine from this specification, including examples, the application rates for any specific situation.

The terms "soil" and "growth media" are employed in the present specification and claims in their broadest sense to be inclusive of all conventional "soils" as defined in Webster's New International Dictionary, Second Edition, Unabridged (1961). Thus the terms refer to any substance or media in which vegetation may take root and grow, and are intended to include not only earth but also compost, manure, muck, humus, sand and the like, adapted to support plant growth.

What is claimed is:
1. Herbicidal composition comprising an inert carrier and a herbicidally effective amount of an N-(1-alken-1-yl) urea of the formula

$$\begin{array}{c} \text{H} \quad \text{O} \quad \text{R}^3 \quad\quad\quad \text{R}^1 \\ |\quad\; ||\quad | \quad\quad\quad\; / \\ \text{R—N—C—N—CH=C} \\ \quad\quad\quad\quad\quad\quad\quad\quad \backslash \\ \quad\quad\quad\quad\quad\quad\quad\quad \text{R}^2 \end{array}$$

wherein R is selected from the group consisting of chlorophenyl, dichlorophenyl, fluorophenyl and trifluoromethylphenyl, $R^1$ and $R^2$ are methyl and $R^3$ is alkyl having a maximum of 4 carbon atoms.

2. Herbicidal composition according to claim 1 wherein R is dichlorophenyl.

3. Herbicidal composition according to claim 1 wherein R is trifluoromethyl.

4. Herbicidal composition according to claim 1 wherein R has a substituent in the 4 position of the phenyl ring.

5. Herbicidal composition of claim 1 wherein the urea is 1 - (3,4 - dichlorophenyl) - 3 - isopropyl - 3 - (2-methyl-1-propen-1-yl) urea.

6. Herbicidal composition of claim 1 wherein the urea is 1 - (m - trifluoromethylphenyl) - 3 - methyl - 3 - (2-methyl-1-propen-1-yl) urea.

7. Herbicidal composition of claim 1 wherein the urea is 1 - (p - chlorophenyl) - 3 - (methyl) - 3 - (2 - methyl-1-propen-1-yl) urea.

8. Herbicidal composition of claim 1 wherein the urea is 1 - (3,4 - dichlorophenyl) - 3 - (methyl) - 3 - (2-methyl-1-propen-1-yl) urea.

9. Herbicidal composition of claim 1 wherein the urea is 1 - (2,4 - dichlorophenyl) - 3 - (methyl) - 3 - (2-methyl-1-propen-1-yl) urea.

10. Herbicidal composition of claim 1 wherein the urea is 1 - (2,6 - dichlorophenyl) - 3 - (isopropyl) - 3 - (2-methyl-1-propen-1-yl) urea.

11. Herbicidal composition of claim 1 wherein the urea is 1 - (p - chlorophenyl) - 3 - (isopropyl) - 3 - (2-methyl-1-propen-1-yl) urea.

12. Herbicidal composition of claim 1 wherein the urea is 1 - (m - trifluoromethylphenyl) - 3 - (ethyl) - 3 - (2-methyl-1-propen-1-yl) urea.

13. Herbicidal method which comprises applying to plants a herbicidally effective amount of a urea of the formula $$\begin{array}{c} \text{H} \quad \text{O} \quad \text{R}^3 \quad\quad\quad \text{R}^1 \\ |\quad\; ||\quad | \quad\quad\quad\; / \\ \text{R—N—C—N—CH=C} \\ \quad\quad\quad\quad\quad\quad\quad\quad \backslash \\ \quad\quad\quad\quad\quad\quad\quad\quad \text{R}^2 \end{array}$$

wherein R is selected from the group consisting of chlorophenyl, dichlorophenyl, fluorophenyl and trifluoromethylphenyl, $R^1$ and $R^2$ are methyl and $R^3$ is alkyl having a maximum of 4 carbon atoms.

14. Herbicidal method according to claim 13 wherein R is dichlorophenyl.

15. Herbicidal method according to claim 13 wherein R is trifluoromethylphenyl.

16. Herbicidal method according to claim 13 wherein R has a substituent in the 4 position of the phenyl ring.

17. Herbicidal method according to claim 13 wherein said urea is 1 - (3,4 - dichlorophenyl) - 3 - (methyl)-3-(2-methyl-1-propen-1-yl) urea.

18. Herbicidal method according to claim 13 wherein said urea is 1 - (p - chlorophenyl) - 3 - (methyl) - 3 - (2-methyl-1-propen-1-yl) urea.

References Cited

UNITED STATES PATENTS

| | | | | |
|---|---|---|---|---|
| 2,655,534 | 10/1953 | Searle | | 260—553 |
| 3,241,942 | 3/1966 | Martin et al. | | 71—120 |
| 2,723,192 | 11/1955 | Todd | | 71—120 |
| 3,190,740 | 6/1965 | Wolter | | 71—120 |

FOREIGN PATENTS 658,036   11/1963   Italy ............... 71—120

LEWIS GOTTS, Primary Examiner

G. HOLLRAH, Assistant Examiner

U.S. Cl. X.R.

71—76, DIG. 1